United States Patent
Hsueh

(10) Patent No.: US 12,373,063 B2
(45) Date of Patent: Jul. 29, 2025

(54) TOUCHSCREEN CALIBRATION METHOD AND READABLE STORAGE MEDIA

(71) Applicant: MITAC COMPUTING TECHNOLOGY CORPORATION, Taoyuan (TW)

(72) Inventor: Wei-Cheng Hsueh, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 18/585,896

(22) Filed: Feb. 23, 2024

(65) Prior Publication Data

US 2024/0319821 A1 Sep. 26, 2024

(30) Foreign Application Priority Data

Mar. 20, 2023 (TW) .................................. 112110304

(51) Int. Cl.
G06F 3/041 (2006.01)
(52) U.S. Cl.
CPC .................................. G06F 3/0418 (2013.01)
(58) Field of Classification Search
CPC .................................................... G06F 3/0418
USPC ......................................................... 345/178
See application file for complete search history.

(56) References Cited

U.S. PATENT DOCUMENTS

| 2004/0230873 | A1* | 11/2004 | Ward | H04L 41/12 |
| | | | | 714/39 |
| 2006/0020623 | A1* | 1/2006 | Terai | G06F 3/067 |
| | | | | 707/999.102 |
| 2006/0209041 | A1* | 9/2006 | Studt | G06F 3/0418 |
| | | | | 345/173 |
| 2017/0228097 | A1* | 8/2017 | Honjo | G06F 1/1662 |
| 2018/0335870 | A1* | 11/2018 | Ali | G06F 3/044 |

FOREIGN PATENT DOCUMENTS

| CN | 113835562 B | 3/2023 |
| TW | 1766352 B | 6/2022 |

OTHER PUBLICATIONS

Taiwan Patent Office, Office Action, Patent Application Serial No. TW112110304, issued Jul. 7, 2023.

* cited by examiner

*Primary Examiner* — Chanh D Nguyen
*Assistant Examiner* — Gloryvid Figueroa-Gibson
(74) *Attorney, Agent, or Firm* — RABIN & BERDO, P.C.

(57) ABSTRACT

A touchscreen calibration method and a readable storage media are provided. The method includes: A processor accesses a system administrative events database, which is configured to record a pointer error event; and the processor executes a calibration process when the processor determines the pointer error event does exist. The calibration process includes: disabling a plurality of touchscreens; re-enabling the plurality of touchscreens after a preset time period; loading an apparatus registry file after the plurality of touchscreens are restarted; and establishing connections between the processor and the plurality of touchscreens based on the apparatus registry file.

16 Claims, 5 Drawing Sheets

TOUCHSCREEN CALIBRATION METHOD AND READABLE STORAGE MEDIA

CROSS-REFERENCE TO RELATED APPLICATION

This non-provisional application claims priority under 35 U.S.C. § 119(a) to Patent Application No. 112110304 filed in Taiwan, R.O.C. on Mar. 20, 2023, the entire contents of which are hereby incorporated by reference.

BACKGROUND

Technical Field

The present invention relates to a calibration method and a storage media that are applied to a computer.

Related Art

In an existing computer device supporting driving a plurality of touchscreens, there may be a problem in which a user touches a touchscreen but a display does not display a corresponding operation result, or a UI arrow displayed by a pointer is not displayed on a touched display. Although a current Win10 (Published by Microsoft Corporation) operating system provides "calibrate the screen for stylus or touch input" via a display setting, to manually tap on a mark point on the display to correct the problem. However, it is very inconvenient to manually tap and follow step-by-step instructions on the screen. In addition, the calibration is only suitable for resolving problems occurring during this startup process. Errors may still occur in the computer during a future startup process, resulting in inconvenience for an operation of the user.

SUMMARY

In view of this, the present disclosure provides a touchscreen calibration method. The touchscreen calibration method is configured to be executed by an operating system running on a processor that is capable of being connected to a plurality of touchscreens. The method includes: A processor accesses a system administrative events database, which is configured to record a pointer error event; and the processor executes a calibration process when the processor determines the pointer error event does exist. The calibration process includes: disabling the plurality of touchscreens; re-enabling the plurality of touchscreens after a first preset time period; loading an apparatus registry file after all the plurality of touchscreens are restarted; and establishing connections between the processor and the plurality of touchscreens based on the apparatus registry file.

The present disclosure also provides a readable storage media configured to store a program for being executed by a processor that executes the program to implement the touchscreen calibration method.

DETAILED DESCRIPTION

Figure 1:
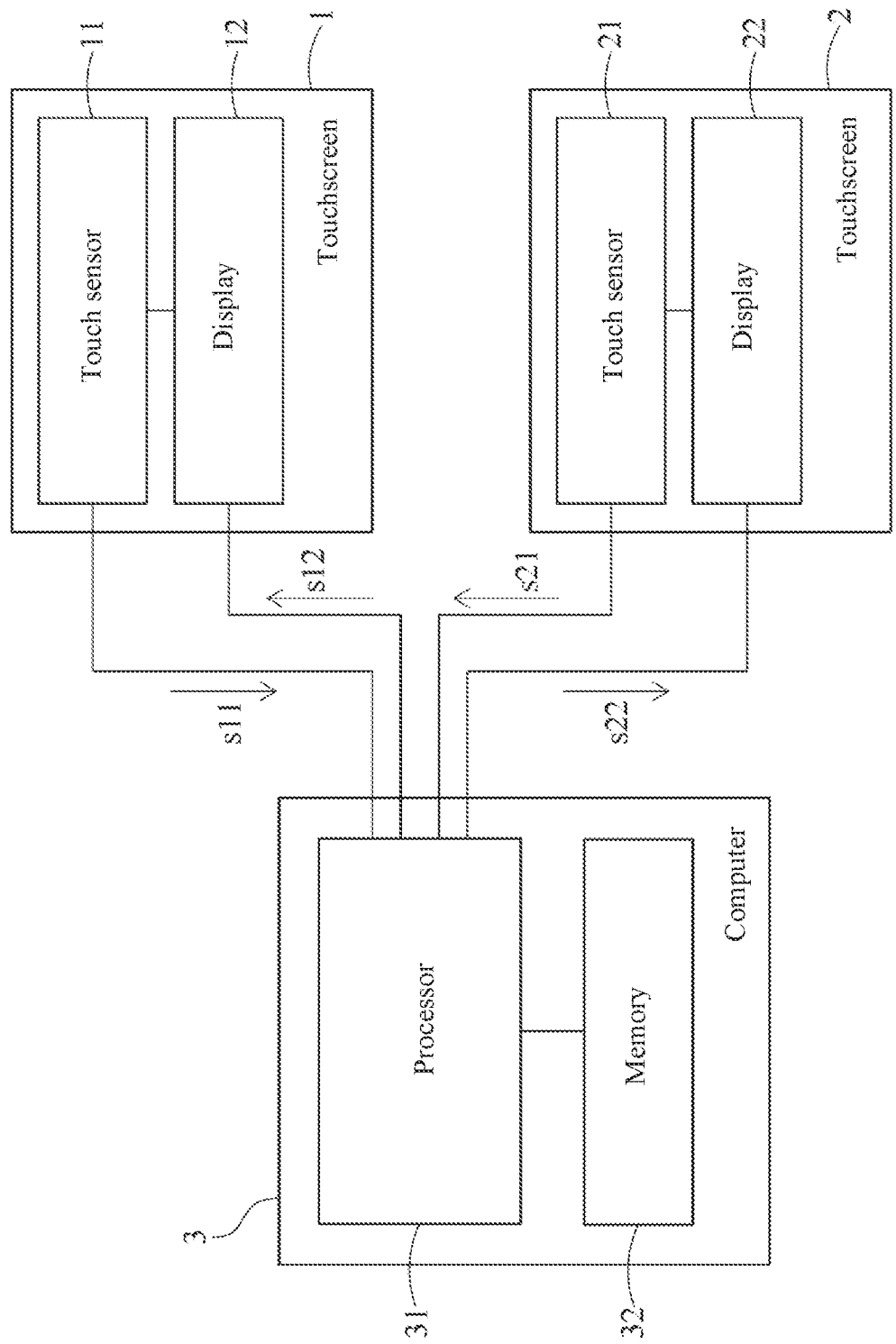
FIG. 1 is a schematic diagram of a block of a computer connected to a plurality of touchscreens in a normal running state.

FIG. 1 is a schematic diagram of a block of a computer connected to a plurality of touchscreens in a normal running state. Refer to FIG. 1. A computer 3 includes a processor 31 and a memory 32 coupled to the processor 31. The computer 3 may be, but is not limited to, a personal computer, a notebook computer, a server, a tablet computer, or a mobile phone. The processor 31 may be, but is not limited to, an SoC chip, a central processing unit (CPU), a micro-control unit (Micro-Control Unit, MCU), an application specific integrated circuit (Application Specific Integrated Circuit, ASIC), a field programmable gate array (Field Programmable Gate Array, FPGA), or a logic circuit. The processor 31 is suitable for performing a touchscreen calibration method. The memory 32 may be, but is not limited to, a flash memory (flash memory) or a read-only memory (Read-only memory, ROM), for example, an erasable programmable read-only memory (Erasable Programmable Read-Only Memory, EPROM), a flash read-only memory (Flash Read-Only Memory, Flash ROM), an EEPROM, or an FRU (Field-Replaceable Unit, FRU) EEPROM. The memory 32 is not limited to one or more and is suitable for storing operating system (Operating System, OS) code and code for the touchscreen calibration method. In some embodiments, the operating system uses the Microsoft Window operating system of the Microsoft Corporation, but is not limited to this.

The computer 3 is suitable for driving a plurality of touchscreens. As shown in the embodiment in FIG. 1, the computer 3 drives a touchscreen 1 and a touchscreen 2. The touchscreen 1 includes a touch sensor 11 and a display 12. The touchscreen 2 includes a touch sensor 21 and a display 22. The touchscreens 1 and 2 may be independent external apparatuses or may be components integrally configured with the computer 3. For example, the computer 3 is a notebook computer including the touchscreen 1, and the notebook computer may be connected to at least one additional touchscreen 2. Alternatively, the computer 3 is a host of a personal computer and may be connected to two or more touchscreens 1 and 2. The touch sensors 11 and 21 may be touch panels, and may use, based on operating principles of the touch sensors 11 and 21, capacitive touch panels, infrared touch panels, ultrasonic touch panels, resistive touch panels, electromagnetic touch panels, or image sensing touch panels. This is not limited. The displays 12 and 22 may be, but are not limited to, liquid crystal display panels, Micro LED (Micro LED) display panels, organic light-emitting diode (Organic Light-Emitting Diode, OLED) display panels, or plasma display panels. It should be understood that connections mentioned in this disclosure are not limited to direct connections or indirect connections (couplings by using other elements), or to wired connections or wireless connections.

As shown in FIG. 1, when a user touches the touchscreen 1, the touch sensor 11 detects a contact point of the user on the panel, generates a touch sensing signal s11, and transmits the touch sensing signal s11 to the processor 31. The processor 31 generates and transmits a corresponding control signal s12 to the display 12 of the touchscreen 1 based on the touch sensing signal s11 to control a display state of the display 12. Pointers mentioned in this disclosure are positioning points on the displays 12 and 22 controlled by the processor 31. In some embodiments, the positioning points are directly displayed on the displays 12 and 22 in a visualized manner, such as arrow symbols or flashing "|" symbols during character input. In other embodiments, the positioning points are not directly displayed on the displays 12 and 22, but the processor 31 may determine contact positions of the user on the touchscreens 1 and 2 by tracing the positioning points and generate corresponding control instructions. For example, when the user taps an application program symbol on a mobile phone, the processor 31 determines that an application program corresponds to a positioning point on the display based on the touch sensing signal s11 and sends a control instruction to request the display 12 to display a login page of the application program. Similarly, when a user touches the touchscreen 2, the touch sensor 21 detects a contact point of the user on the panel, generates a touch sensing signal s21, and transmits the touch sensing signal s21 to the processor 31. The processor 31 generates and transmits a corresponding control signal s22 to the display 22 of the touchscreen 2 based on the touch sensing signal s21 to control a display state of the display 22.

The computer 3 records, in the memory 32, a correspondence between the touch sensor 11 and the display 12 of the touchscreen 1 and a correspondence between the touch sensor 21 and the display 22 of the touchscreen 2. In general, when the computer 3 is first connected to an apparatus (for example, the touchscreens 1 and 2), a registry file of the apparatus is established to record the apparatus. Therefore, when the apparatus is connected to the computer 3 again, the computer 3 may quickly match, based on the registry file, a corresponding driver to be connected to the apparatus. The Microsoft Window operating system of the Microsoft is used as an example, apparatus information is recorded in an apparatus registry file database (For example, the Windows Registry). In a normal running state, the computer 3 establishes connections between the computer 3 and the plurality of touchscreens 1 and 2 based on the foregoing correspondences. However, in some cases, the foregoing connections may be invalid.

Figure 2:
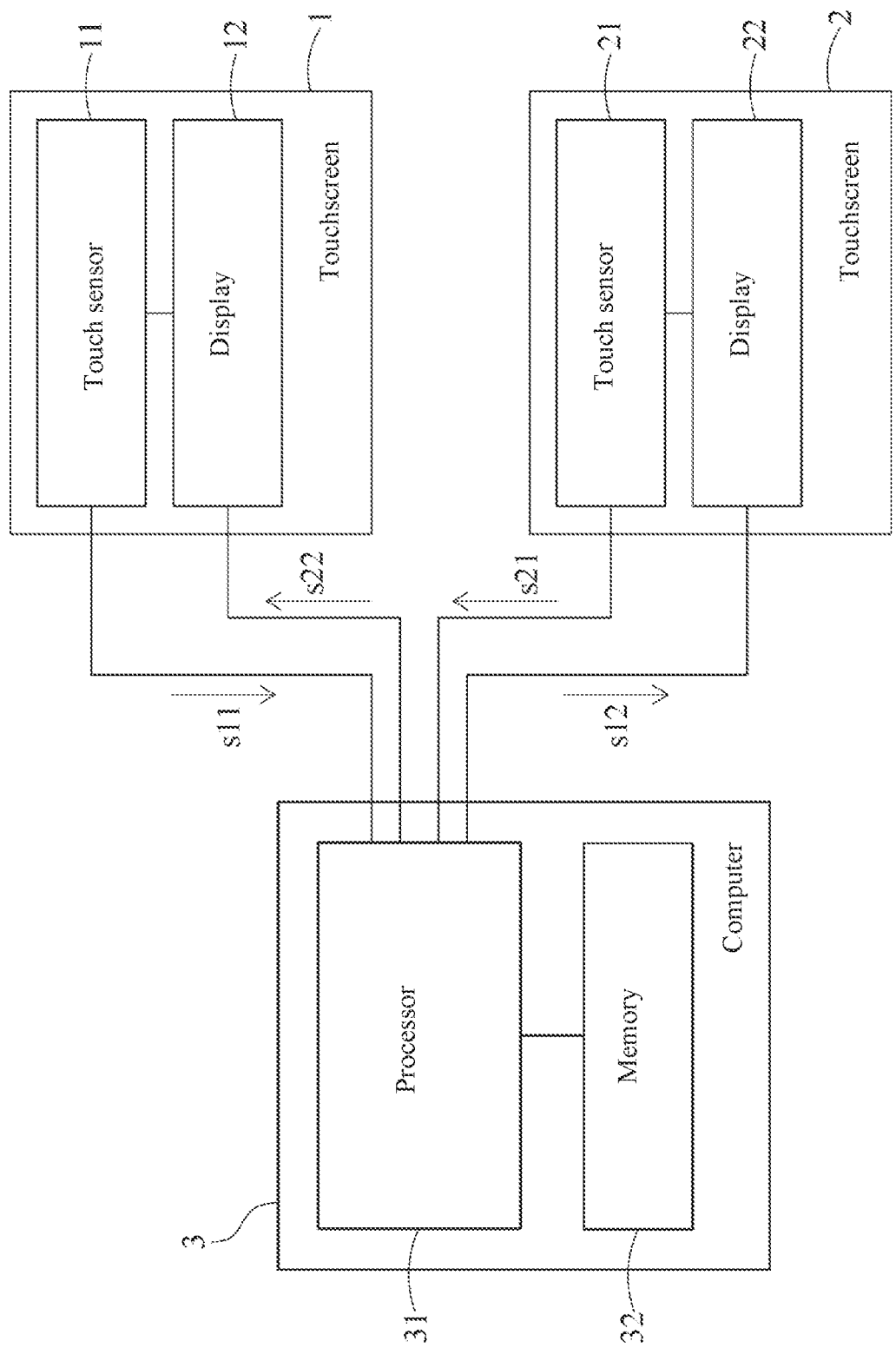
FIG. 2 is a schematic diagram of a block of a computer connected to a plurality of touchscreens in an abnormal running state.

FIG. 2 is a schematic diagram of a block of a computer 3 connected to a plurality of touchscreens in an abnormal running state. Refer to FIG. 2. In an abnormal running state, when a user touches a touchscreen 1, a touch sensor 11 detects a contact point of the user on a panel, generates a touch sensing signal s11, and transmits the touch sensing signal s11 to a processor 31. The processor 31 generates and transmits a corresponding control signal s12 to a display 22 of a touchscreen 2 based on the touch sensing signal s11. Therefore, when the user slides on the touchscreen 1, the display 12 does not execute a corresponding instruction. One of reasons for the foregoing abnormal running state is a delay occurs when hardware is set up. For example, in a case that the computer 3 is simultaneously connected to the touchscreen 1 and the touchscreen 2, when a connection between the computer 3 and the touch sensor 11 is established, the display 12 may not be in a connected state due to a driver problem or a hardware enabling problem. In this case, if the display 22 is completed standby, the computer 3 may erroneously determine the display 22 as the display 12, and the foregoing abnormal running state may be formed.

Figure 3:
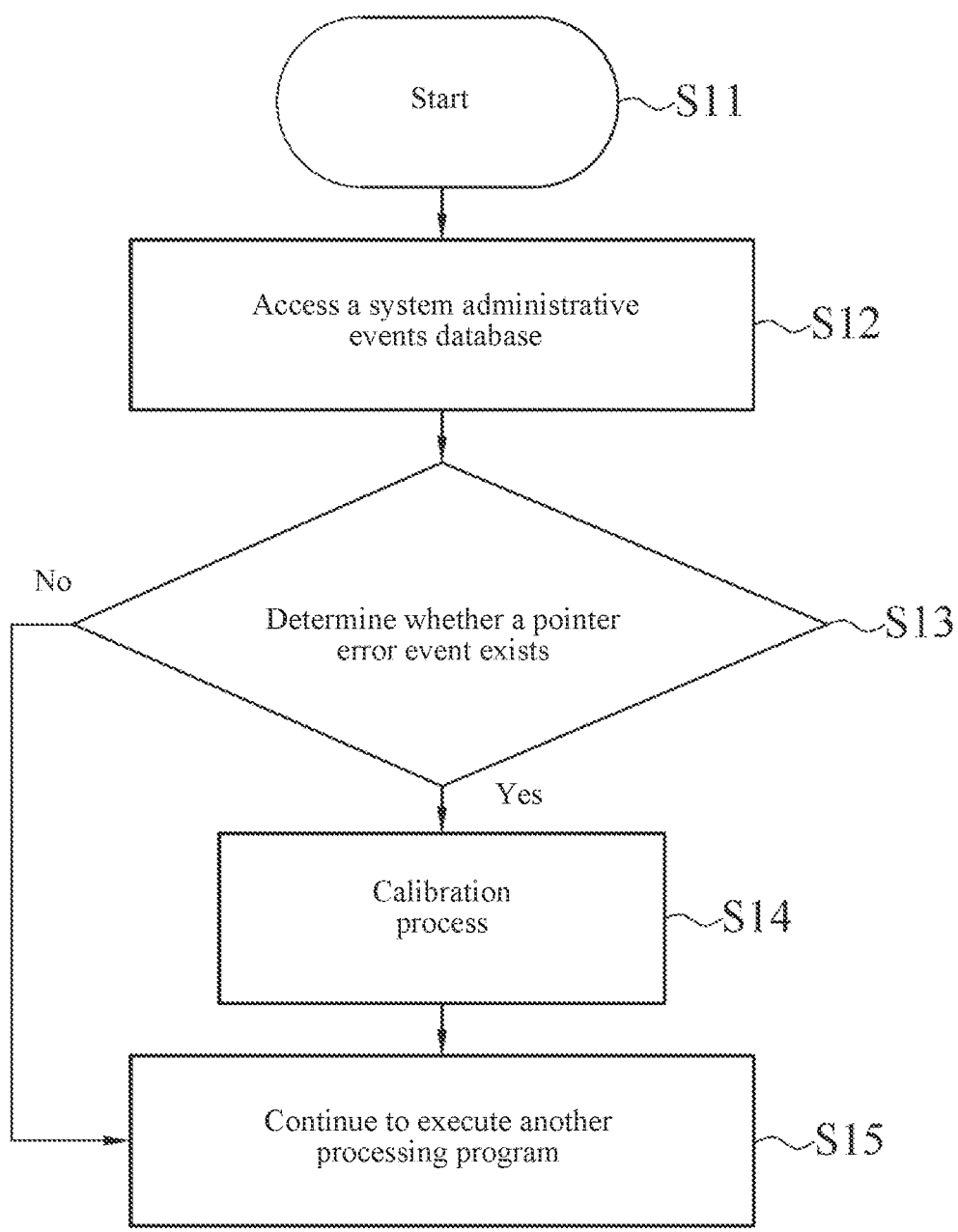
FIG. 3 is a running flow chart of a touchscreen calibration method according to some embodiments.

FIG. 3 is a running flow chart of a touchscreen calibration method according to some embodiments. Refer to FIG. 3. After starting performing the touchscreen calibration method (step S11), a computer 3 accesses a system administrative events database (step S12). A system administrative events database is configured to record a pointer error event. In some embodiments, the pointer error event may be information that a pointer apparatus cannot identify a connected display apparatus. In some embodiments, the pointer error event is error information generated by a system when the foregoing abnormal running state occurs. In some embodiments, the pointer error event is error information generated by a system when the computer 3 detects a touchscreen 1 and fails to detect a display 12 of the touchscreen 1. The Microsoft Window operating system is used as an example, the pointer error event may be displayed on a summary of administrative events interface of an event viewer (Windows Event Viewer), and an event identifier (Event ID) of the pointer error event is "263". The content of the event is "A pointer device has no information about the monitor it is attached to". The computer 3 determines whether the pointer error event exists based on an error event stored in the system administrative events database (step S13). When determining that the pointer error event does not exist (in step S13, a determination result is "no"), the computer 3 continues to execute another processing program (step S15), and ends the touchscreen calibration method. When determining that the pointer error event exists (in step S13, a determination result is "yes"), the computer 3 executes a calibration process (step S14). In some embodiments, the touchscreen calibration method may be applied to a program automatically running at startup. Therefore, when entering an operating system program, the computer 3 automatically executes the touchscreen calibration method included in the program automatically running at startup. Therefore, a problem in which the existing calibration method sometimes fails during a startup process can be prevented. In other embodiments, the touchscreen calibration method may also be applied to an application program that runs due to user's manually triggering.

Figure 4:
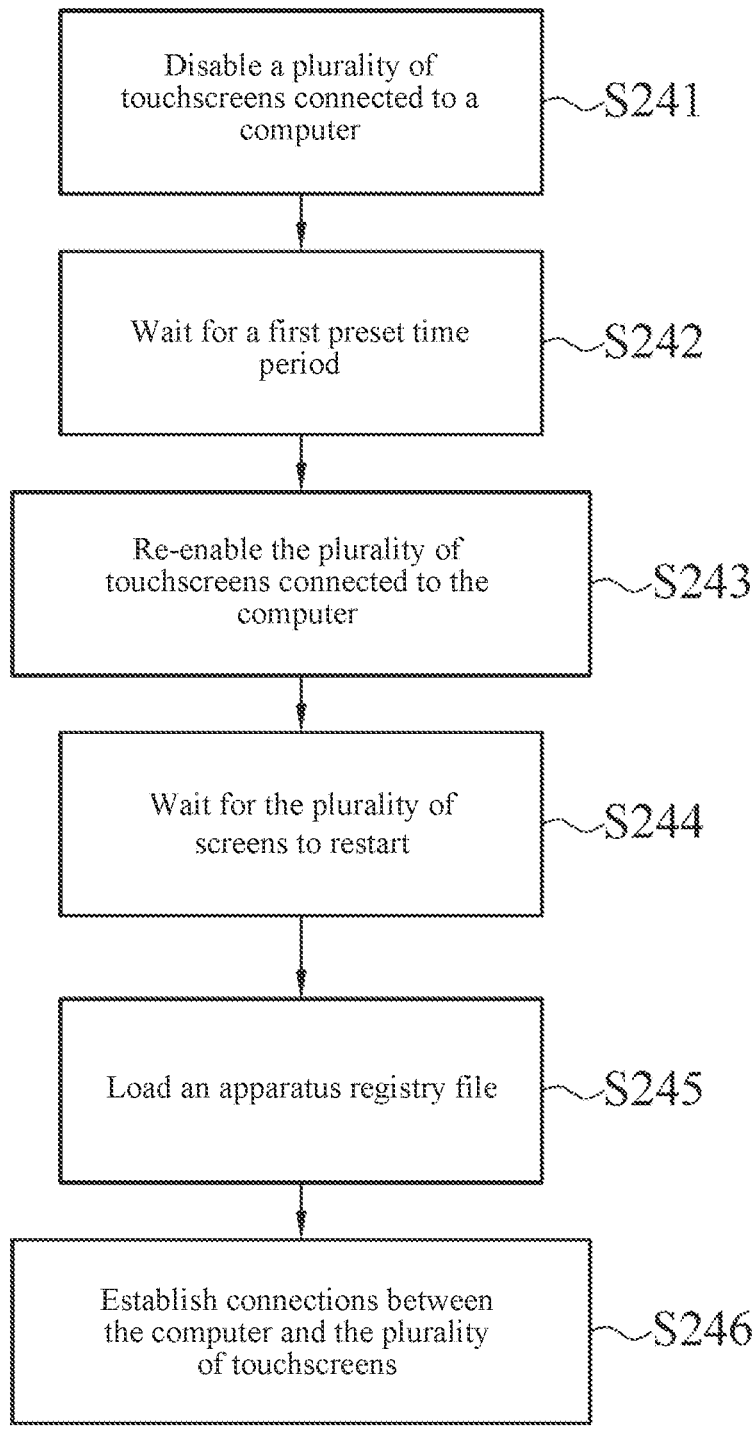
FIG. 4 is a running flow chart of a calibration process according to some embodiments.

FIG. 4 is a running flow chart of a calibration process according to some embodiments. Refer to FIG. 4. When a computer 3 executes the calibration process, the computer 3 disables a plurality of touchscreens 1 and 2 connected to the computer 3 (step S241). Therefore, connection statuses between the computer 3 and the plurality of touchscreens 1 and 2 are interrupted during a startup process. FIG. 2 is used as an example, a correspondence between the touch sensor 11 and the display 22 is interrupted. The disabling may be implemented by disconnecting power supply to the touchscreens 1 and 2, or through an enable control line (EN) of the touchscreens 1 and 2. The computer 3 waits for a first preset time period after disabling the touchscreens 1 and 2 (step S242). A time period required for turning off each of the touchscreens 1 and 2 completely should be taken into consideration when setting up the first preset time period. In the present disclosure, it is finds that when the first preset time period is five seconds or more, it is sufficient for the touchscreens 1 and 2 to be disabled.

Then, the computer 3 re-enables the plurality of touchscreens 1 and 2 connected to the computer 3 (step S243). The enabling may be implemented by supplying the power supply to the touchscreens 1 and 2, or through the enable control line (EN) of the touchscreens 1 and 2. The computer 3 waits for the touchscreens 1 and 2 to restart (step S244) after re-enabling the touchscreens 1 and 2 (step S243).

In the step of waiting for the touchscreens 1 and 2 to restart (step S244), in some embodiments, the computer 3 waits for a second preset time period after re-enabling the touchscreens 1 and 2 (step S243) to ensure that each of the touchscreens 1 and 2 completely restarts (step S244). In other embodiments, each of the touchscreens 1 and 2 includes a detection pin. A potential state of the detection pin is changed after the touchscreen 1 or the touchscreen 2 is started up. For example, the detection pin of the touchscreens 1 is changed from a low potential to a high potential after the touchscreens 1 is started up. Therefore, the computer 3 reads the states of the detection pins of the touchscreens 1 and 2 respectively to determine whether the touchscreens 1 and 2 are both completely enabled. In this embodiment, when the computer 3 determines that the plurality of touchscreens 1 and 2 are both enabled, the computer 3 loads an apparatus registry file (step S245) to ensure a correspondence between the touch sensor 11 and the display 12 of the touchscreen 1 and a correspondence of the touch sensor 21 and the display 22 of the touchscreen 2, and then establishes connection between the computer 3 and the plurality of touchscreens 1 and 2 based on the apparatus registry file (step S246). When determining that either the touchscreen 1 or 2 is not enabled, the computer 3 performs steps S241 to S244 again. In other embodiments, the computer 3 runs drivers for the touchscreens 1 and 2 to determine, when the driver has detected both the touchscreens 1 and 2, that the plurality of touchscreens 1 and 2 are both enabled. When determining that either the touchscreen 1 or 2 is not enabled, the computer 3 performs steps S241 to S244 again. In some embodiments, when determining that a count of performing steps S241 to S244 again reaches a preset count, the computer 3 ends the touchscreen calibration method.

The apparatus registry file is configured to record a correspondence between the touch sensor 11 and the display 12 of the touchscreen 1 and a correspondence between the touch sensor 21 and the display 22 of the touchscreen 2. In some embodiments, when the touchscreen 1 or the touchscreen 2 is first connected to the computer 3, the computer 3 records, in the apparatus registry file, the touch sensors 11 or 21 as well as the displays 12 or 22 of the connected touchscreens 1 or 2. Because the apparatus registry file is established one by one after the touchscreens 1 and 2 are first connected to the computer 3 (for example, after driving the touchscreen 1, then driving the touchscreen 2), there is no problem that the touch sensors 11 and 21 as well as the displays 12 and 22 correspond incorrectly. The Microsoft Window operating system is used as an example, the apparatus registry file is recorded in an apparatus registry file database (Windows Registry). A user may view and edit an apparatus record by using a Registry editor. Therefore, in some embodiments, the apparatus registry file may be alternatively edited by the user to establish the correspondence between the touch sensor 11 and the display 12 and the correspondence between the touch sensor 21 and the display 22.

Figure 5:
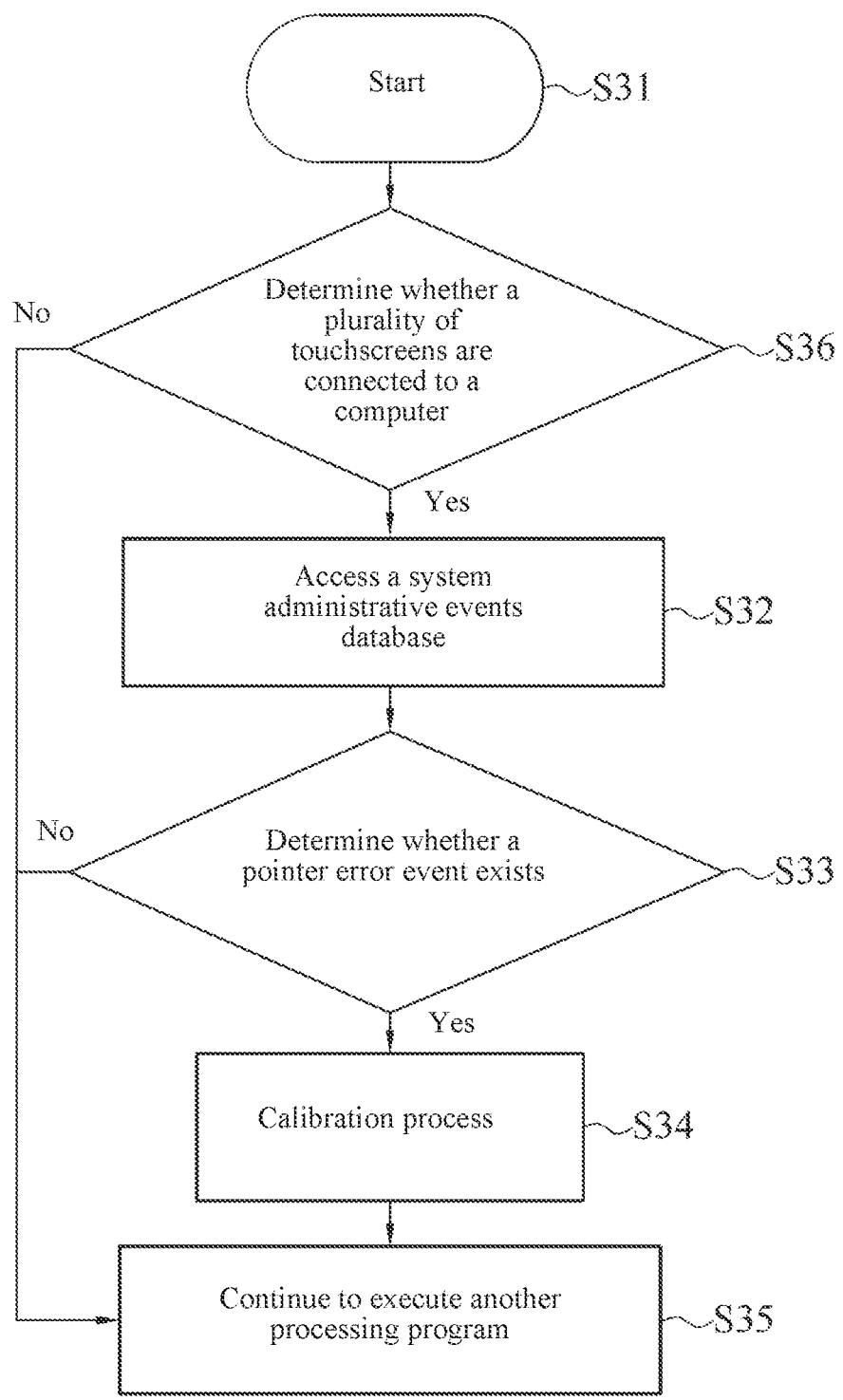
FIG. 5 is a running flow chart of a touchscreen calibration method according to other embodiments.

FIG. 5 is a running flow chart of a touchscreen calibration method according to other embodiments. Refer to FIG. 5. A main difference between the embodiment in FIG. 5 and the embodiment in FIG. 3 is in step S36. After starting performing the touchscreen calibration method (step S31), a computer 3 first determines whether a plurality of touchscreens are connected to the computer 3 (step S36). When determining that only a single touchscreen 1 is connected to the computer 3 (in step S36, a determination result is "no"), the computer 3 continues to execute another processing program (step S35), and ends the touchscreen calibration method. When determining that a plurality of touchscreens 1 and 2 are connected to the computer 3 (in step S36, a determination result is "yes"), the computer 3 performs steps S32 to S35. Because the single touchscreen 1 does not experience the foregoing abnormal running state in which the touch sensor 11 and the display 12 correspond incorrectly, subsequent programs may be skipped to reduce computing resources. Implementations of steps S32 to S35 may be set by referring to the foregoing steps S12 to S15. In some embodiments, the computer waits for the second preset time period to determine whether the plurality of touchscreens are connected to the computer 3 (step S36) to ensure that the touchscreens 1 and 2 are completely enabled.

In some embodiments, a readable storage media may be configured to store a program. When the program is executed by the computer 3, the steps of the touchscreen calibration method of any embodiment in this disclosure are implemented. The readable storage media may be, but is not limited to, a phase-change memory (Phase-change memory, PRAM), a static random access memory (Static Random Access Memory, SRAM), a dynamic random access memory (Dynamic Random Access Memory, DRAM), a removable hard disk, a hard disk drive, a random access memory (RAM), a read-only memory (ROM), an erasable programmable read-only memory (an EPROM or a flash memory), a compact disk read-only memory (CD-ROM), a digital versatile disc (DVD), a magnetic disk, a magnetic tape, a USB flash drive, a memory card, or cloud storage. In some embodiments, the program is stored as an independent software product in the readable storage media. The user can obtain and install the program by using a receiving apparatus (such as a CD driver, a port, or a network interface) of the computer 3. In some embodiments, the program is a part of the operating system. In some embodiments, the program is stored in the memory 32 of the computer 3 to implement, by using the computer 3, the touchscreen calibration method.

In summary, in some embodiments of the touchscreen calibration method in this disclosure, the system administrative events database is accessed to determine whether the pointer error event exists in the system administrative events database. When the pointer error event does exist, the calibration process is performed. Therefore, even if there are a plurality of correspondence errors between the touch sensor 11 and the display 12 of the touchscreen 1 and correspondence errors between the touch sensor 21 and the display 22 of the touchscreen 2 during the startup process of the computer 3, the correspondence errors can still be identified and corrected. In some embodiments, the touchscreen calibration method may be implemented by a program automatically running at startup. Therefore, the computer 3 automatically identifies and corrects the error correspondences of the touchscreens 1 and 2 during the startup process.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A touchscreen calibration method, configured to be executed by an operating system running on a processor that is capable of being connected to a plurality of touchscreens, each of the plurality of touchscreens including a detection pin, a potential state of the detection pin of each touchscreen being changed after the touchscreen is turned on, the method comprising:

accessing, by the processor, a system administrative events database, which is configured to record a pointer error event, and executing, by the processor, a calibration process when the processor determines the pointer error event does exist, wherein the calibration process comprises:

disabling the plurality of touchscreens;

re-enabling the plurality of touchscreens after a first preset time period;

reading the detection pin of each touchscreen to determine that all the plurality of touchscreens have been restarted, and loading an apparatus registry file after all the plurality of touchscreens are restarted; and establishing connections between the processor and the plurality of touchscreens based on the apparatus registry file.

2. The touchscreen calibration method according to claim 1, wherein the pointer error event comprises information that a pointer apparatus cannot identify a connected display apparatus.

3. The touchscreen calibration method according to claim 1, wherein an event identifier of the pointer error event is Event ID #263.

4. The touchscreen calibration method according to claim 1, wherein when each of the plurality of touchscreens is first connected to the processor, the processor is configured to record each connected touchscreen in the apparatus registry file.

5. The touchscreen calibration method according to claim 1, wherein the processor is configured to read the apparatus registry file from an apparatus registry file database (Windows Registry).

6. The touchscreen calibration method according to claim 1, wherein the operating system of the processor comprises an event viewer (Windows Event Viewer) configured to access the system administrative events database to display the pointer error event.

7. The touchscreen calibration method according to claim 1, after the step of the accessing, by the processor, the system administrative events database, further comprising: skipping the calibration process when the processor determines that the pointer error event does not exist.

8. The touchscreen calibration method according to claim 1, wherein the step of the loading the apparatus registry file after all the plurality of touchscreens are re-started comprises: waiting for a second preset time period to determine that all the plurality of touchscreens have been re-started.

9. The touchscreen calibration method according to claim 1, before the step of the accessing the system administrative events database, further comprising: starting accessing the system administrative events database when the processor determines that the plurality of touchscreens are connected with the processor.

10. The touchscreen calibration method according to claim 1, before the step of the accessing the system administrative events database, further comprising: ending the touchscreen calibration method when the processor determines that there is no touchscreen connected or there is only a single touchscreen connected.

11. The touchscreen calibration method according to claim 10, wherein the step in which the processor determines that there is no touchscreen connected or there is only a single touchscreen connected further comprises: waiting for a second preset time period to determine a number of the touchscreens connected to the processor.

12. The touchscreen calibration method according to claim 1, after the step of the establishing connections between the processor and the plurality of touchscreens based on the apparatus registry file, further comprising: re-executing the calibration process when the processor determines that any one of the plurality of touchscreens is not restarted.

13. The touchscreen calibration method according to claim 12, further comprising: ending the touchscreen calibration method when the processor determines that a count of re-executions of the calibration process reaches a preset count.

14. The touchscreen calibration method according to claim 1, wherein each of the plurality of touchscreens comprises a touch sensor and a display, and the step of the establishing connections between the processor and the plurality of touchscreens based on the apparatus registry file further comprises: establishing a correspondence between each touch sensor and each display based on the apparatus registry file.

15. The touchscreen calibration method according to claim 14, further comprising: receiving, by the processor, a setting parameter to adjust the correspondence between each touch sensor and each display comprised in the apparatus registry file.

16. The touchscreen calibration method according to claim 1, wherein the first preset time period is greater than or equal to five seconds.

* * * * *